(12) United States Patent
Watanabe et al.

(10) Patent No.: US 11,680,896 B2
(45) Date of Patent: Jun. 20, 2023

(54) ELECTROMAGNETIC SIGNAL ANALYSIS APPARATUS AND ELECTROMAGNETIC SIGNAL ANALYSIS PROGRAM

(71) Applicant: FEMTO Deployments Inc., Okayama (JP)

(72) Inventors: Akira Watanabe, Okayama (JP); Tadashi Okuno, Okayama (JP); Takeji Ueda, Okayama (JP)

(73) Assignee: FEMTO DEPLOYMENTS INC., Okayama (JP)

( * ) Notice: Subject to any disclaimer, the term of this patent is extended or adjusted under 35 U.S.C. 154(b) by 110 days.

(21) Appl. No.: 17/437,920

(22) PCT Filed: Oct. 8, 2020

(86) PCT No.: PCT/JP2020/038099
§ 371 (c)(1),
(2) Date: Sep. 10, 2021

(87) PCT Pub. No.: WO2021/075344
PCT Pub. Date: Apr. 22, 2021

(65) Prior Publication Data
US 2022/0128463 A1 Apr. 28, 2022

(30) Foreign Application Priority Data
Oct. 18, 2019 (JP) .............................. JP2019-190658

(51) Int. Cl.
*G01N 21/3577* (2014.01)
*G01N 21/3581* (2014.01)

(52) U.S. Cl.
CPC ..... *G01N 21/3577* (2013.01); *G01N 21/3581* (2013.01)

(58) Field of Classification Search
CPC .................. G01N 21/3577; G01N 21/3581
See application file for complete search history.

(56) References Cited

U.S. PATENT DOCUMENTS

2008/0123712 A1* 5/2008 Zhou ...................... G01N 21/39
372/55
2009/0107214 A1* 4/2009 Cox ...................... G01K 11/006
73/29.02

(Continued)

FOREIGN PATENT DOCUMENTS

JP      2000-074827 A    3/2000
JP      2007-108151 A    4/2007

(Continued)

*Primary Examiner* — Hugh Maupin
(74) *Attorney, Agent, or Firm* — Polsinelli PC (57) ABSTRACT

An electromagnetic signal analysis apparatus includes a frequency spectrum obtaining unit 11 to obtain a frequency spectrum that is generated based on an electromagnetic signal obtained by a spectral device 20 and represents a property value with respect to a frequency, a water vapor fitting processing unit 12 to fit a waveform of a single fitting function or a composite waveform, of a plurality of fitting functions to a frequency spectrum at a frequency at which absorption of the electromagnetic waves by water vapor is increased, and a property analyzing unit 14 to analyze a property of a liquid sample using at least two values that determine a characteristic of the fitting function used for the fitting, so that the frequency spectrum, at the frequency at which absorption of the electromagnetic waves by water vapor generated from surfaces of the liquid sample is increased is processed to analyze the property of the liquid sample.

14 Claims, 8 Drawing Sheets

(56) References Cited

U.S. PATENT DOCUMENTS

2010/0195108 A1* 8/2010 Prystupa ................ G01N 21/86
                                                        356/446
2015/0115147 A1* 4/2015 Oberreit ................. H01J 49/06
                                                        250/282

FOREIGN PATENT DOCUMENTS

JP         2008-046574 A    2/2008
JP         2010-164511 A    7/2010
WO    WO 2018/110481 A1    6/2018

* cited by examiner

ELECTROMAGNETIC SIGNAL ANALYSIS APPARATUS AND ELECTROMAGNETIC SIGNAL ANALYSIS PROGRAM

CROSS REFERENCE TO RELATED APPLICATIONS

This application is a National Phase filing under 35 U.S.C. § 371 of PCT/JP2020/038099 filed on Oct. 8, 2020; which application in turn claims priority to Application No. 2019-190658 filed in Japan on Oct. 18, 2019. The entire contents of each application are hereby incorporated by reference.

TECHNICAL FIELD

The present invention relates to an electromagnetic signal analysis apparatus and electromagnetic signal analysis program and, in particular, relates to an apparatus to analyze a property of electromagnetic waves via a liquid sample disposed on an optical path of a spectral device, and a program adopted for this.

BACKGROUND ART

Conventionally, there have been provided spectral devices to measure properties of a substance using electromagnetic waves. A spectral device causes electromagnetic waves to be transmitted through or reflected off a sample so as to measure physical properties or chemical properties of the sample from a change of the electromagnetic waves that is generated by interaction of the electromagnetic waves and the sample. A frequency spectrum of the sample observed by this spectral measurement has a spectrum structure inherent in the sample. In particular, in spectroscopy using terahertz waves, which is one kind of electromagnetic waves, intermolecular interaction caused by hydrogen bonding, for example, is observed.

However, because spectra observed by the spectral measurement overlap one another, it is difficult to extract a peak of a specific frequency. Consequently, it is unclear where in the frequency spectrum a characteristic of the sample appears or in what waveform the characteristic of the sample appears. It was a problem that the characteristic is extremely difficult to find.

In order to solve such a problem, there is proposed a terahertz wave analysis apparatus whereby terahertz waves are transmitted through or reflected off a liquid sample to be measured that is disposed on an optical path, and the terahertz waves thus applied to the liquid sample are detected by a spectral device so that a terahertz wave signal thus obtained is analyzed to make it possible to clearly visualize a characteristic in accordance with a property of the liquid sample (see, for example, patent document 1). In this analysis apparatus disclosed in patent document 1, a composite waveform of a plurality of fitting functions is fitted to a frequency spectrum obtained from the terahertz wave signal, and a graph is generated using, as parameters, at least two values that determine characteristics of the plurality of fitting functions employed for this fitting.

Note that because electromagnetic waves are also absorbed by water vapor that exists in the atmosphere, there is a possibility that, the frequency spectrum obtained includes a property of the water vapor. Therefore, in the analysis apparatus disclosed in patent document 1, prior to the fitting processing with the fitting functions, processing is performed to leave out an extreme value at a frequency at which absorption of the terahertz waves by the water vapor, is increased. That is, of absorbance data with respect to each frequency in the frequency spectrum, the extreme value at the frequency at which absorption of the terahertz waves by the water vapor other than the liquid sample is increased is left out so that, the fitting is performed in a state where an influence of spectrum absorption by the water vapor is less likely to be received.

Patent Document 1: WO2018/110481.
Patent Document 2: Japanese Unexamined Patent Application Publication No. 2010-164511.
Patent Document 3: Japanese Unexamined Patent Application Publication No. 2008-46574.
Patent Document 4: Japanese Unexamined Patent Application Publication No. 2007-108151.
Patent Document 5: Japanese Unexamined Patent Application Publication No. 2000-74827.

DISCLOSURE OF THE INVENTION

Problems to be Solved by the Invention

As described above, it is known that electromagnetic waves are absorbed by water vapor. In view of this, when spectral measurement of electromagnetic waves is performed, an attempt is generally made to avoid an influence of spectrum, absorption by water vapor contained in the atmosphere other than a sample (see, for example, patent documents 2 to 5 in addition to patent, document 1 described above). In contrast to this, inventors of this application have found that absorption of electromagnetic waves by water vapor is positively utilized so that a property inherent in a liquid sample can be analyzed from a frequency spectrum as a result of spectral measurement.

That is, it is an object of the invention to make it possible to facilitate detection of a characteristic inherent in a liquid sample by performing analysis that positively utilizes absorption of electromagnetic waves by water vapor with respect to an electromagnetic signal detected by a spectral device.

Means for Solving the Problems

In order to solve the above-described problem, an electromagnetic signal analysis apparatus according to the invention analyzes an electromagnetic signal obtained by a spectral device to detect, electromagnetic waves transmitted through or reflected off a liquid sample in a film state that is generated in a space by ejecting a liquid from a nozzle. Specifically, the electromagnetic signal analysis apparatus fits a waveform of a single fitting function or a composite waveform of a plurality of fitting functions to a frequency spectrum at a water vapor absorption frequency, which is a frequency at which absorption of the electromagnetic waves by water vapor is increased, the frequency spectrum at the water vapor absorption frequency being part of a frequency spectrum that is generated based on the electromagnetic signal and represents a property value with respect to a frequency, and the electromagnetic signal analysis apparatus analyzes a property of the liquid sample using at least two values that determine a characteristic of the fitting function used for this fitting.

Effects of the Invention

As described above, when the film-state liquid sample is generated in the space by ejecting the liquid from the nozzle, the water vapor is generated from surfaces of the liquid sample, and the electromagnetic waves are transmitted through the water vapor as well. Since this water vapor includes the property of the liquid sample, processing of the frequency spectrum, at the frequency at which absorption of the electromagnetic waves by the water vapor is increased makes it possible to analyze the property of the liquid sample. Besides, the frequency spectrum of the water vapor has a peak clear and sharp and accordingly so easy to read that analysis is relatively easy. According to the invention of the above-described configuration, the frequency spectrum caused by the water vapor generated from the liquid sample is approximated by the waveform of the single fitting function or the composite waveform of the plurality of fitting functions in such a manner that the property of the liquid sample is succeeded, and the property of the liquid sample is analyzed based on values concerning the fitting function used for the approximation. Thus, according to the invention, the electromagnetic signal detected by the spectral device is subjected to analysis that positively utilizes absorption of the electromagnetic waves by the water vapor so that the characteristic inherent in the liquid sample can be easily detected.

BRIEF DESCRIPTION OF THE DRAWINGS

FIG. 4 is a diagram illustrating an example of a frequency spectrum, obtained by a frequency spectrum obtaining unit according to this embodiment.

FIG. 5 is a diagram illustrating an example of a water vapor spectrum generated by a water vapor fitting processing unit according to this embodiment.

FIG. 6 is a diagram illustrating an example of a liquid spectrum generated by a liquid fitting processing unit according to this embodiment.

FIG. 7 is a diagram illustrating an example of a whole frequency spectrum that has undergone fitting according to this embodiment.

FIG. 8 is diagrams illustrating an example of graphs generated by a property analyzing unit according to this embodiment.

FIG. 9 is a diagram illustrating an example of a graph generated by the property analyzing unit according to this embodiment.

FIG. 10 is a diagram illustrating an example of a graph generated by the property analyzing unit according to this embodiment.

FIG. 11 is a diagram illustrating an example of a graph generated by the property analyzing unit, according to this embodiment.

MODE FOR CARRYING OUT THE INVENTION

Hereinafter, one embodiment of the invention will be described based on the drawings. FIG. 1 is a block diagram illustrating a functional configuration example of an electromagnetic signal analysis apparatus according to this embodiment. An electromagnetic signal analysis apparatus 10 according to this embodiment analyzes an electromagnetic signal obtained by a spectral device 20 as to a liquid sample, and includes, as a functional configuration, a frequency spectrum obtaining unit 11, a water vapor fitting processing unit 12, a liquid fitting processing unit 13, and a property analyzing unit 14.

The electromagnetic wave to be analyzed by the electromagnetic signal analysis apparatus 10 according to this embodiment is, for example, a terahertz wave, infrared radiation, visible radiation, and ultraviolet radiation, and any other electromagnetic wave may be analyzed insofar as the electromagnetic wave includes a frequency band absorbed by water vapor. Note that in the case of the terahertz wave in particular, because an intermolecular interaction generated in a liquid sample in response to the terahertz wave has a complicated process, spectra observed by spectral measurement overlap one another by such a high degree that it is difficult to extract a peak of a specific frequency as compared with infrared spectroscopy and optoelectronic spectroscopy. The electromagnetic signal analysis apparatus 10 according to this embodiment can analyze such a terahertz wave signal.

Any of hardware, a DSF (Digital Signal Processor), and software can constitute each of the function blocks 11 to 14. For example, when software constitutes each of the function blocks 11 to 14, each of the function blocks 11 to 14 actually includes a CPU, a RAM, a ROM, and the like of a computer and is implemented by operating an electromagnetic signal analysis program, stored in recording media such as the RAM, the ROM, a hard disk, or a semiconductor memory.

The frequency spectrum obtaining unit 11 obtains a frequency spectrum, representing a property value with respect to a frequency that is generated based on an electromagnetic signal detected by the spectral device 20. In this embodiment, a frequency spectrum representing absorbance as one example of the property value is obtained. The frequency spectrum obtaining unit 11 may obtain a frequency spectrum detected by the spectral device 20 or the frequency spectrum obtaining unit 11 itself may generate a frequency spectrum, based on an electromagnetic signal generated by the spectral device 20 so as to obtain the frequency spectrum.

The spectral device 20 causes electromagnetic waves to be transmitted through or reflected off a liquid sample to be measured that is disposed on an optical path and detects the electromagnetic waves thus applied to the liquid sample. In this embodiment, various known types may be employed as the spectral device 20. However, the spectral device 20 for use in this embodiment includes a predetermined nozzle and ejects a liquid from this nozzle to generate a film state of the liquid sample in a space (above a path of the electromagnetic waves).

FIG. 2 is diagrams illustrating a configuration example of a liquid film generation device for use in this embodiment. As illustrated in FIG. 2(*a*), the liquid film generation device includes a container 1, a liquid film cartridge 2, a tube pump 3, an outgoing tube 4, and an incoming tube 5. The container 1 includes a collection tank 1*a* of the liquid. The liquid film cartridge 2 includes a nozzle 21 (see FIG. 2(*b*)) to eject the liquid and generate a liquid film (hereinafter referred to as a sample liquid film 100).

The tube pump 3 takes in by suction the liquid to be measured from the collection tank 1*a* via the incoming tube 5, pressurizes the intake liquid, and discharges the liquid to the liquid film cartridge 2 via the outgoing tube 4. The liquid film cartridge 2 ejects, from the nozzle 21, the liquid discharged from the collection tank 1*a* by the tube pump 3 so as to generate the sample liquid film 100 of a sheet shape having planar surfaces in a space. Side surfaces of the container 1 and the liquid film cartridge 2 have holes close to a height where the sample liquid film 100 is formed. Via the holes, electromagnetic waves are transmitted through the sample liquid film 100.

The collection tank 1a collects and stores the liquid that flows down from the liquid film cartridge 2. The liquid stored in the collection tank 1a is taken in by suction again by the tube pump 3, pressurized, and ejected from, the nozzle 21 of the liquid film cartridge 2. In this manner, the liquid in the collection tank 1a circulates, and the sample liquid film 100 is generated by the nozzle 21 in the process of circulation of the liquid.

Figure 1:
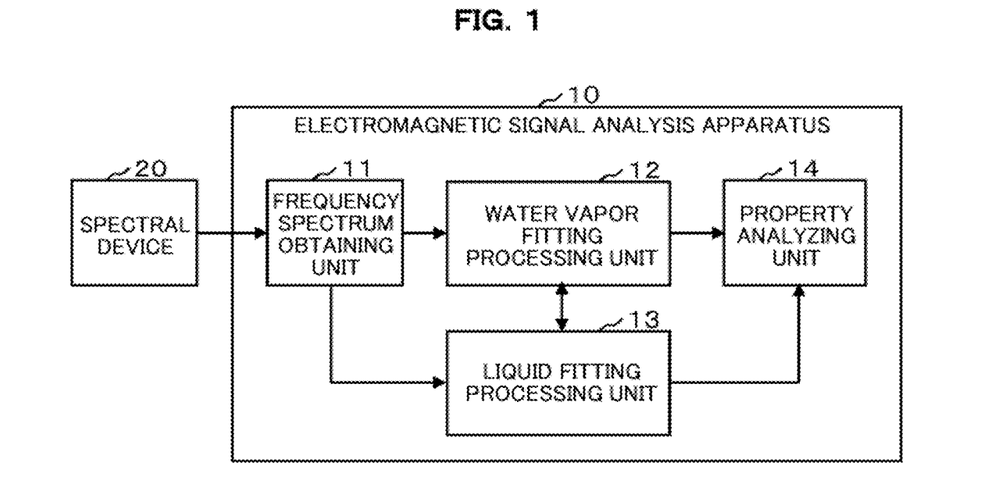
FIG. 1 is a block diagram illustrating a functional configuration example of an electromagnetic signal analysis apparatus according to this embodiment.
Figure 2:
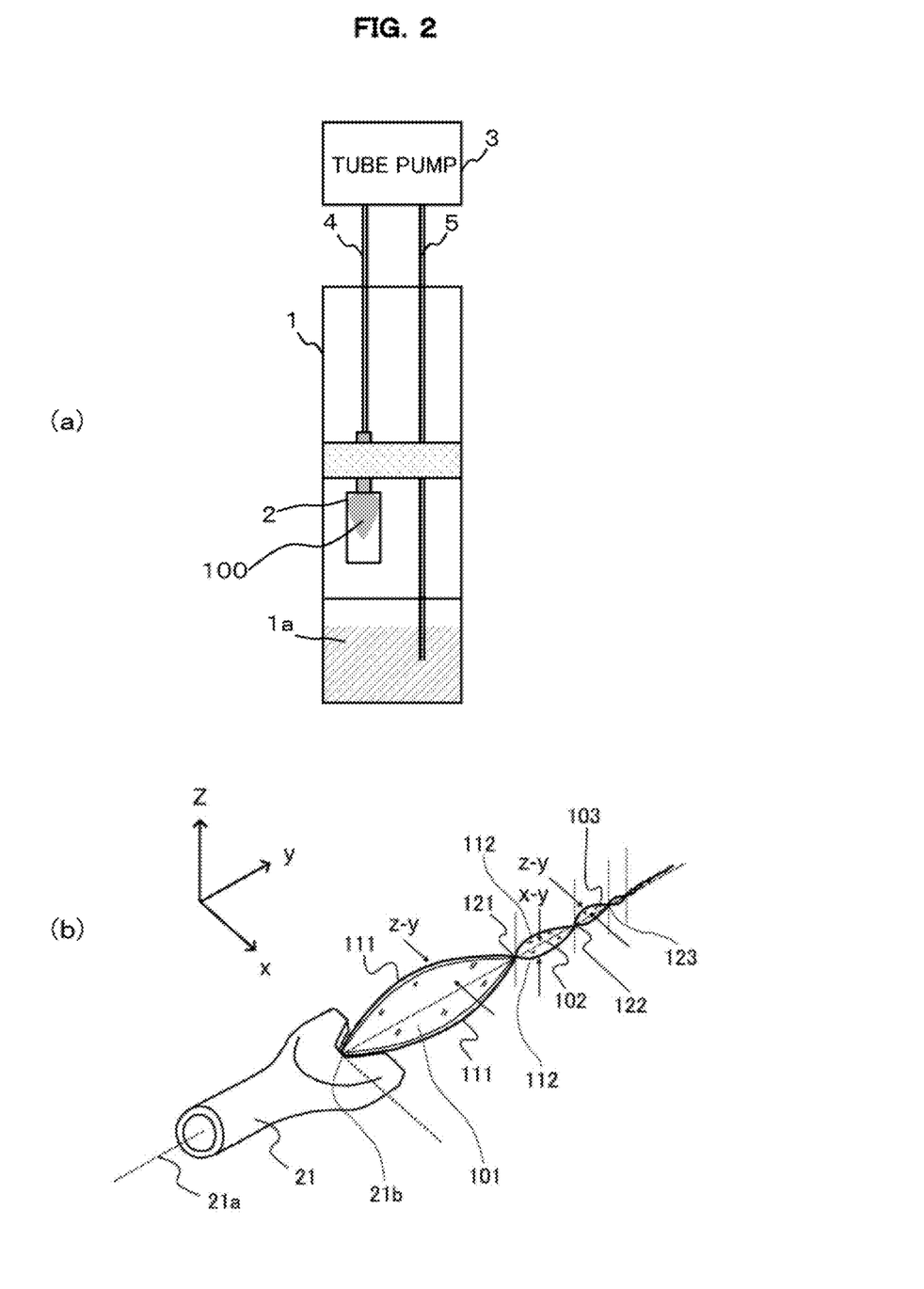
FIG. 2 is diagrams illustrating a configuration example of a liquid film generation device for use in this embodiment.

FIG. 2(b) is a diagram, illustrating the sample liquid film 100 generated by the nozzle 21. Here, three-dimensional coordinate axes that define a space are represented by x-y-z. A center axis 21a of the nozzle 21 is supposed to be oriented in a y-axis direction. A distal end of the nozzle 21 has a slit-shaped opening 21b perpendicular to the center axis 21a, and this slit is supposed to be parallel to an x-axis.

As illustrated in FIG. 2(b), the liquid ejected from the opening 21b provided in the distal end of the nozzle 21 successively forms a plurality of liquid film planes 101 to 103 perpendicular to one another. The first liquid film plane 101 is formed of the liquid ejected from the opening 21b of the nozzle 21 between two string-like fluid columns 111 that flow in a z-y plane due to surface tension of the liquid. That is, the two string-like fluid columns 111 flowing in a smooth arc collide at a fluid column concurrence 121, and form the first liquid film plane 101 between the opening 21b of the nozzle 21 and the fluid column concurrence 121 due to surface tension of the liquid. Consequently, the first, liquid film plane 101 is a plane perpendicular to the x-axis and parallel to the z-y plane.

The two string-like fluid columns 111 that have collided at the fluid column concurrence 121 turn by an angle of 90 degrees, become two string-like fluid columns 112 that flow in an x-y plane, and while flowing in a smooth arc, collide at a next fluid column concurrence 122. Thus, the second liquid film plane 102 is formed between the first fluid column concurrence 121 and the second fluid column concurrence 122 due to surface tension of the liquid. Consequently, the second liquid film plane 102 is perpendicular to the first liquid film plane 101, and is a plane perpendicular to the x-axis and parallel to the x-y plane.

In a similar manner to the first liquid film plane 101 and the second liquid film plane 102, the third liquid film plane 103 is formed between the second fluid column concurrence 122 and a third fluid column concurrence 123 due to surface tension of the liquid. The third liquid film plane 103 is perpendicular to the second liquid film plane 102, and is a plane perpendicular to the x-axis and parallel to the z-y plane. Among the liquid film planes 101 to 103 thus formed, the spectral device 20 causes electromagnetic waves to be transmitted through or reflected off the first liquid film plane 101. This first liquid film plane 101 corresponds to the "liquid sample" in the scope of claims.

Note that a configuration of the liquid film generation device and the nozzle 21 described here is one example and this is not limitative. Any device and any nozzle may be used in this embodiment insofar as the device and the nozzle can generate a liquid film in a space by ejection of the liquid as illustrated in FIG. 2(b).

Figure 3:
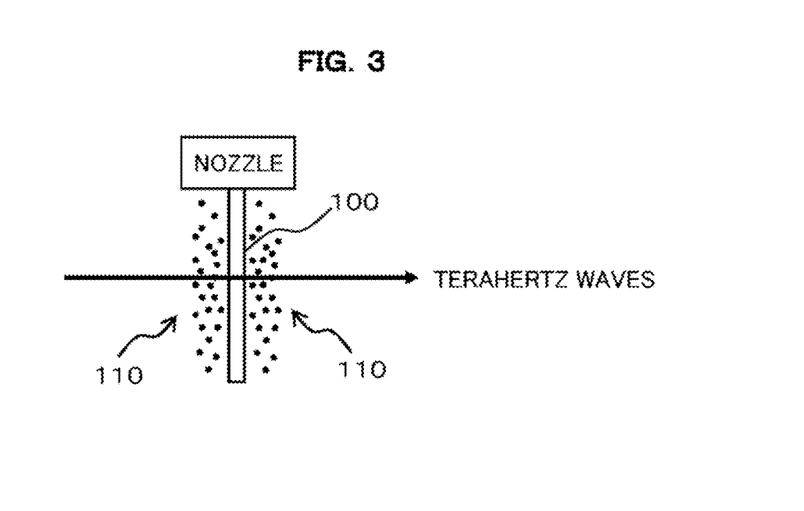
FIG. 3 is a diagram, illustrating how water vapor is generated around a liquid sample generated by a nozzle.

FIG. 3 is a diagram illustrating how water vapor is generated around the liquid sample generated by the nozzle 21. When the sample liquid film 100 (the liquid sample) is generated in a space by ejecting the liquid from the nozzle 21, water vapor 110 is generated from surfaces of the sample liquid film 100. Electromagnetic waves advancing on the optical path of the spectral device 20 are transmitted through the water vapor 110 as well and transmitted through or reflected off the sample liquid film 100.

Figure 4:
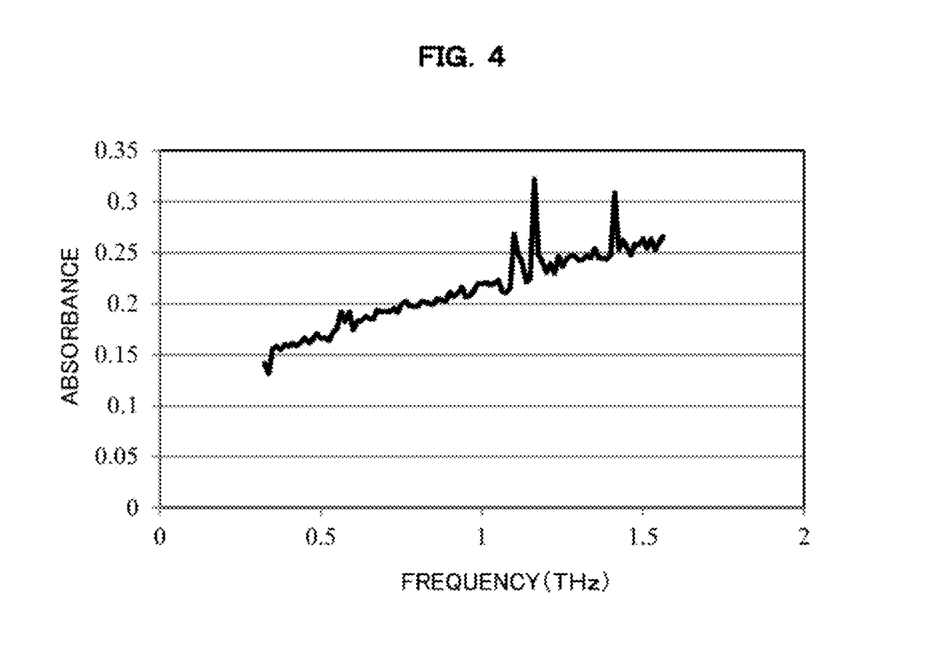

FIG. 4 is a diagram illustrating one example of a frequency spectrum obtained by the frequency spectrum obtaining unit 11. In FIG. 4, a vertical axis represents absorbance while a horizontal axis represents frequency, and the frequency spectrum in a range of 0 to 2 THz is illustrated. The frequency spectrum has a different waveform in accordance with each of liquid samples of different properties. It is difficult to specify where in the waveform, a characteristic of the liquid sample appears or in what waveform the characteristic of the liquid sample appears. The electromagnetic signal analysis apparatus 10 according to this embodiment analyzes this frequency spectrum to clearly exhibit a characteristic in accordance with a property of the liquid sample.

Referring back to FIG. 1, the configuration of the electromagnetic signal analysis apparatus 10 will be described. The water vapor fitting processing unit 12 performs processing to fit a waveform of a single fitting function or a composite waveform of a plurality of fitting functions to a frequency spectrum at a frequency at which absorption of the electromagnetic waves by water vapor is increased, the frequency spectrum, at the frequency being part of the frequency spectrum obtained by the frequency spectrum obtaining unit 11. Hereinafter, the frequency at which absorption of the electromagnetic waves by water vapor is increased will be referred to as "water vapor absorption frequency", and the frequency spectrum at the water vapor absorption frequency that is generated by the water vapor fitting processing unit 12 will be referred to as "water vapor spectrum".

Using data provided by NICT (National Research and Development Agency: The National Institute of Information and Communications Technology), for example, it can be specified at what frequency absorption of electromagnetic waves by water vapor is increased. For electromagnetic communication, the NICT discloses data of a radio wave attenuation factor of air (including water vapor) to the public. A database of HITRANonline disclosed on a website to the public may be employed. Use of such data makes it possible to specify the frequency at which absorption of electromagnetic waves by water vapor is increased. FIG. 4 exhibits some frequencies at which peaks of the absorbance are high in extremal manners, and these are the water vapor absorption frequencies.

The water vapor fitting processing unit 12 performs fitting using, as one example of the fitting function, a plurality of normal distribution functions (Gaussian functions) each having a center frequency, an amplitude, and a width at least one of which is different. That is, the water vapor fitting processing unit 12 individually fits waveforms of the plurality of normal distribution functions each having a center frequency, an amplitude, and a width (such as 1/e width) at least one of which is different to frequency spectra at the plurality of water vapor absorption frequencies in the frequency spectrum obtained by the frequency spectrum obtaining unit 11.

Based on the premise that a single frequency spectrum (peak waveform) can be basically approximated by a waveform of a single normal distribution function as to each of the plurality of water vapor absorption frequencies, the water vapor fitting processing unit 12 calculates a normal distribution function that minimizes a residual between a value of absorbance at each frequency and a value of a waveform of a normal distribution function at each frequency corresponding to the value of absorbance by optimizing calculation using the center frequency, the amplitude, and the width as variables with respect to each of the plurality of water vapor absorption frequencies.

The water vapor spectrum generated by the optimizing calculation by the water vapor fitting processing unit 12 can be represented by the following (formula 1). In this (formula 1), i represents an identification symbol, of the plurality of water vapor absorption frequencies (i=1, 2, . . . , m), $\lambda_i$ represents a water vapor absorption frequency, $I_i$ represents an absorbance at the water vapor absorption frequency, $\lambda_{0i}$ represents a center frequency of a normal distribution function, $a_{0i}$ represents an amplitude of the normal distribution function, and $a_{1i}$ represents a width of the normal distribution function.

[Formula 1]

$$\text{Water Vapor Spectrum} = \sum_i a_{0i} I_i \exp\left(\frac{\lambda_{0i} - \lambda_i}{a_{1i}}\right)^2 \quad (1)$$

Figure 5:
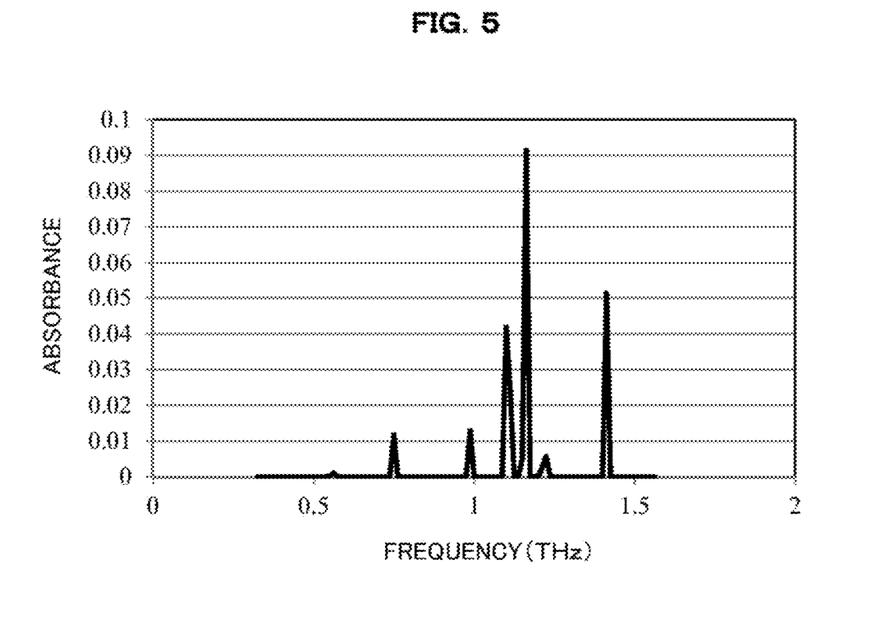

FIG. 5 is a diagram illustrating an example of the water vapor spectrum generated by the water vapor fitting processing unit 12. As illustrated in FIG. 5, in the wafer vapor spectrum generated by the water vapor fitting processing unit 12, frequency spectra around the plurality of water vapor absorption frequencies at which the peaks of absorbance are extremely high in the whole frequency spectrum illustrated in FIG. 4 are individually approximated by waveforms of a plurality of normal distribution functions. The water vapor spectrum illustrated in FIG. 5 illustrates waveforms only of the peak components of absorbance at the plurality of water vapor absorption frequencies.

That is, the absorbance of the water vapor spectrum illustrated in FIG. 5 indicates a difference value of intensity from a reference value at each of the water vapor absorption frequencies. The reference value is a value of absorbance that corresponds to a fundamental portion (base portion) of a waveform that shapes a peak. In this embodiment, in a frequency spectrum generated by the liquid fitting processing unit 13 described below, each of absorbances at the plurality of water vapor absorption frequencies is used as the reference value at the plurality of water vapor absorption frequencies.

Here, the example is described in which the waveform of the single normal distribution function is fitted to the frequency spectrum at the single water vapor absorption frequency (a single peak waveform). However, this is not limitative. For example, a composite waveform of a plurality of normal distribution functions may be fitted to the frequency spectrum at the single water vapor absorption frequency. When fitting accuracy is higher in the case of approximation by the composite waveform of the plurality of normal distribution functions than in the case of approximation by the waveform of the single normal distribution function, for example, the fitting may be performed with the composite waveform.

The liquid fitting processing unit 13 performs processing to fit the composite waveform of the plurality of fitting functions to the frequency spectrum except for peak components at the water vapor absorption frequencies in the frequency spectrum obtained by the frequency spectrum obtaining unit 11. Hereinafter, the frequency spectrum generated by the liquid fitting processing unit 13 will be referred to as "liquid spectrum".

Here, "except for peak components at the water vapor absorption frequencies" does not mean deleting absorbance data itself at the water vapor absorption frequencies but means separating only the peak components at the water vapor absorption frequencies from the frequency spectrum illustrated in FIG. 4 that has been obtained by the frequency spectrum obtaining unit 11. Separation of only the peak components at the water vapor absorption frequencies corresponds to performance of fitting while regarding the absorbances at the water vapor absorption frequencies as the above-described reference values when the liquid fitting processing unit 13 performs the fitting. This respect is different from patent document 1 in which fitting is performed after absorbance data at water vapor absorption frequencies is left out. As to the separated peak components at the water vapor absorption frequencies, the fitting is performed by the water vapor fitting processing unit 12 as described above.

In this embodiment, the liquid fitting processing unit 13 performs fitting with a polynomial function including a plurality of terms as the plurality of fitting functions. That, is, the liquid fitting processing unit 13 fits a composite waveform, of waveforms respectively specified by terms of orders in a polynomial of an n-th order (n>1) to the frequency spectrum that is part of the frequency spectrum, obtained by the frequency spectrum obtaining unit 11 and from which the peak components as to the water vapor absorption frequencies are separated. Here, the terms of orders in the polynomial of the n-th order are equivalent to the "plurality of fitting functions".

Based on the premise that the liquid spectrum can be approximated by the polynomial function of the n-th order, the liquid fitting processing unit 13 calculates the coefficients of the plurality of terms in the polynomial function by optimizing calculation so as to minimize a residual between a value of absorbance at each frequency and a value of a composite waveform (a value of the polynomial function) at each frequency that corresponds to the value of absorbance. The liquid spectrum generated by optimizing calculation by the liquid fitting processing unit 13 can be represented by the following (formula 2). In this (formula 2), x represents a variable of a single-variable polynomial (a polynomial having only one indeterminate) and indicates a frequency here. j represents each order of the n-th polynomial (j=1, 2, . . . , n), and $b_j$ represents a coefficient of each term.

[Formula 2]

$$\text{Liquid Spectrum} = \sum_j b_j x^j \quad (2)$$

Figure 6:
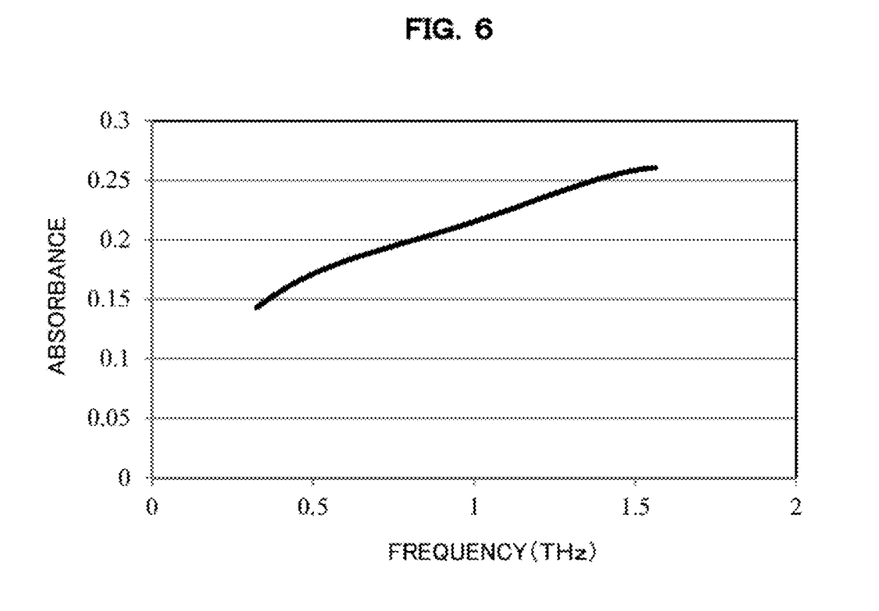

FIG. 6 is a diagram illustrating one example of the liquid spectrum generated by the liquid fitting processing unit 13. As illustrated in FIG. 6, the liquid spectrum generated by the liquid fitting processing unit 13 is the frequency spectrum that has no peak components of absorbance at the water vapor absorption frequencies in the whole frequency spectrum illustrated in FIG. 4 and that is approximated by the composite waveform of the polynomial function.

Figure 7:
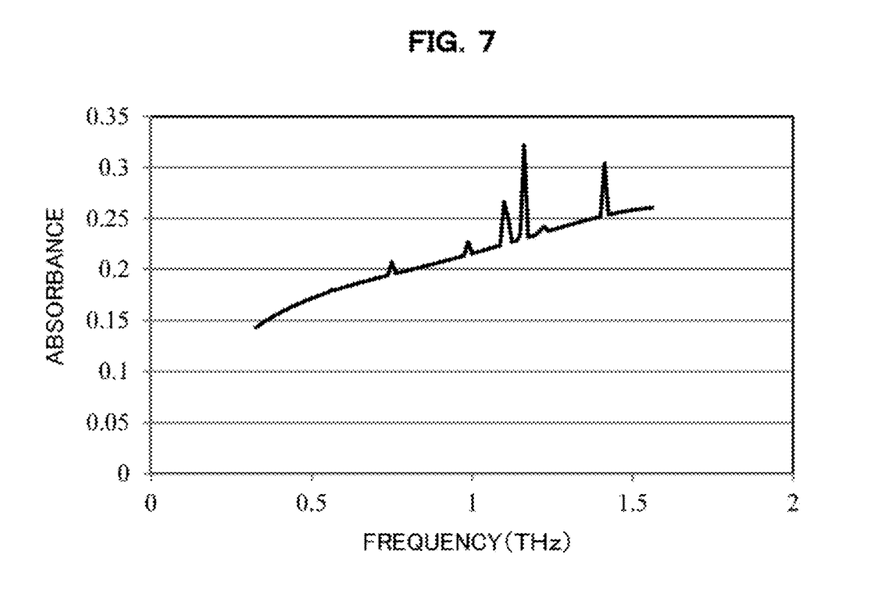

When the water vapor spectrum illustrated in FIG. 5 and the liquid spectrum illustrated in FIG. 6 are combined, they become a frequency spectrum to which the whole frequency spectrum illustrated in FIG. 4 is approximated (hereinafter referred to as whole fitting spectrum). FIG. 7 is a diagram illustrating one example of this whole fitting spectrum. That is, in this embodiment, the frequency spectrum as illustrated in FIG. 4 that is obtained by the frequency spectrum obtaining unit 11 is fitted by a frequency spectrum that is a combination of the water vapor spectrum and the liquid spectrum as in the following formula:

Whole fitting spectrum=Water vapor spectrum+Liquid spectrum

Note that although for convenience of description, the water vapor fitting processing unit 12 and the liquid fitting processing unit 13 are illustrated as different function blocks, the water vapor spectrum and the liquid spectrum can be simultaneously calculated to obtain the whole fitting spectrum.

The property analyzing unit 14 analyzes the property of the liquid sample using at least two values including values that determine characteristics of the plurality of fitting functions used for the fitting by the water vapor fitting processing unit 12 and values that determine characteristics of the plurality of fitting functions used for the fitting by the liquid fitting processing unit 13. The values that determine the characteristics of the plurality of fitting functions used for the fitting by the water vapor fitting processing unit 12 are the center frequencies, the amplitudes, and the widths (values $\lambda_{0i}$, $a_{0i}$, and $a_{1i}$ in (formula 1) above) of the plurality of normal distribution functions. The values that determine the characteristics of the plurality of fitting functions used for the fitting by the liquid fitting processing unit 13 are the coefficients of the polynomial function (value $b_j$ in (formula 2) above). The property analyzing unit 14 analyzes the property of the liquid sample using at least two of these values $\lambda_{0i}$, $a_{0i}$, $a_{1i}$, and $b_j$.

Here, the property analyzing unit 14 may analyze the property of the liquid sample using at least two of the center frequencies $\lambda_{0i}$, the amplitudes $a_{0i}$, and the widths $a_{1i}$ of the plurality of normal distribution functions used for the fitting by the water vapor fitting processing unit 12. The property analyzing unit 14 may analyze the property of the liquid sample using at least, two of the coefficients $b_j$ of the polynomial function used for the fitting by the liquid fitting processing unit 13. The property analyzing unit 14 may analyze the property of the liquid sample using at least one of the center frequencies $\lambda_{0i}$, the amplitudes $a_{0i}$, and the widths $a_{1i}$ of the plurality of normal distribution functions used for the fitting by the water vapor fitting processing unit 12 and at least one of the coefficients $b_j$ of the polynomial function used for the fitting by the liquid fitting processing unit 13.

The content of analysis performed by the property analyzing unit 14 is, for example, predetermined statistical processing or functional processing using the above-described at least two values. The at least two values used for the statistical processing or the functional processing are the value that determines the characteristic of the plurality of fitting functions used for generation of the wafer vapor spectrum, and the value that determines the characteristic of the plurality of fitting functions used for generation of the liquid spectrum, and both of these values are values that reflect the property of the liquid sample. Consequently, a value that results from the predetermined statistical processing or functional processing using these values is an inherent value that reflects the property of the liquid sample.

Therefore, using the statistical value or functional value thus calculated, the property of the liquid sample can be identified and liquid samples having the same or similar property can be classified. Using statistical values or functional values calculated from the frequency spectra of an identical liquid sample that are measured by the spectral device 20 a plurality of times at intervals, analysis can be performed to detect a change of the property of the liquid sample.

Using, as training data, a set of the above-described at least two values calculated from a liquid sample having a known property and data indicative of the property of this liquid sample, the property analyzing unit 14 can perform analysis of inputting the above-described at least two values calculated from a liquid sample having an unknown property into a learned model (predicted model) generated by machine learning using a plurality of training data so as to output data indicative of the property of the liquid sample from, the predicted model. For example, properties, such as a concentration of a specific solvent or dissolvent in a solution, a kind of the solvent or dissolvent contained in the solution, and presence of foreign matter that has gotten mixed in a reference liquid, can be analyzed using the predicted model generated by the machine learning. Note that the properties of the liquid sample described here as analysis targets is one example, and this is not limitative.

Moreover, the property analyzing unit 14 stay generate a predetermined graph using the above-described at least two values as parameters. For example, the property analyzing unit 14 may generate a graph illustrating a relationship between at least two of the center frequencies $\lambda_{0i}$, the amplitudes $a_{0i}$, and the widths $a_{1i}$ of the plurality of normal distribution functions used for generating the water vapor spectrum. The property analyzing unit 14 may calculate an area $A_i$ of a predetermined region of a normal distribution waveform (a waveform region having an amplitude equal to or larger than 1/e width) from an amplitude $a_{0j}$ and a width $a_{1j}$ of each of the plurality of normal distribution functions, and may generate a graph illustrating a relationship between the center frequency $\lambda_{0i}$ and the area $A_i$.

Using one of the plurality of normal distribution functions as a reference, the property analyzing unit 14 may calculate a ratio $R_{xy}$ of an amplitude $a_{0x}$ or a width $a_{1x}$ (x is one of 1 to i) of the normal distribution function as the reference to an amplitude $a_{0y}$ or a width $a_{1y}$ (y is one of 1 to i; x≠y) of another normal distribution function (the ratio $R_{xy}$ is equivalent, to a value indicative of balance between peaks concerning the amplitude $a_{0i}$ or the width $a_{1i}$ that characterizes a waveform of a peak component at each water vapor absorption frequency) with respect to each of the plurality of center frequencies and may generate a graph illustrating a relationship between the center frequency $\lambda_{0y}$ and the ratio $R_{xy}$.

An example will be described below in which a graph is generated using at least two of the center frequencies $\lambda_{0i}$, the amplitudes $a_{0i}$, and the widths $a_{1i}$ of the plurality of normal distribution functions used for the fitting by the water vapor fitting processing unit 12.

Figure 8:
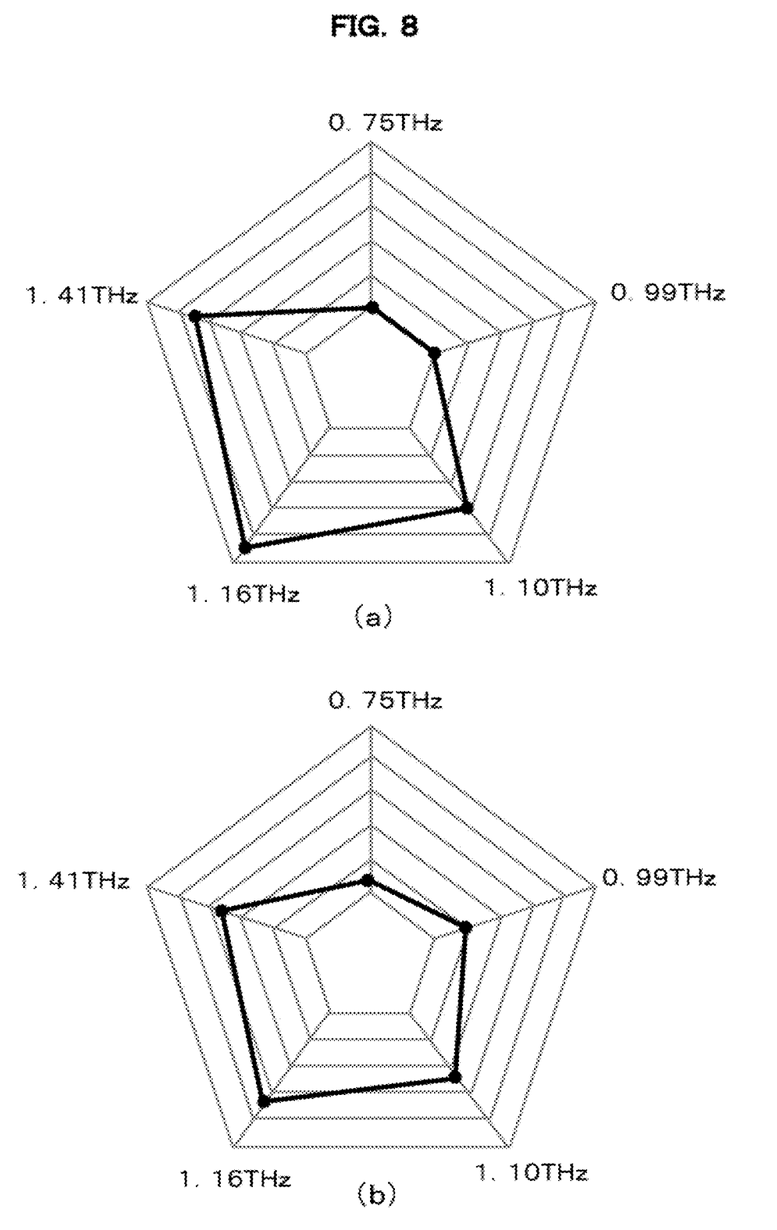

FIG. 8 is diagrams illustrating one example of graphs generated by the property analyzing unit 14. The graphs illustrated in FIG. 8 are radar charts using, as axes, five of the center frequencies $\lambda_{0i}$ (indicative of values substantially approximate to center frequencies of the plurality of water vapor absorption frequencies) of the plurality of normal distribution functions used for generating the water vapor spectrum, with the amplitude $a_{0i}$, the width $a_{1i}$, or the area $A_i$ being indicated as values of each of the axes.

The radar charts in FIG. 8 are examples of radar charts generated when terahertz waves are used as one example of the electromagnetic waves, and five values of the center frequencies $\lambda_{0i}$, namely, 0.75 THz, 0.99 THz, 1.10 THz, 1.16 THz, and 1.41 THz, are used as the axes. The five center frequencies $\lambda_{0i}$ used here correspond to water vapor absorption frequencies at which terahertz waves are absorbed by a large degree, that is, water vapor absorption frequencies having high peaks.

Note that it may be freely define values (center frequency $\lambda_{0i}$, amplitude $a_{0i}$, and width $a_{1i}$) concerning which frequency of the plurality of water vapor absorption frequencies are used for graphic representation. For example, a graph may be generated using values concerning the water vapor absorption frequencies at which absorbance is a predetermined value or higher in the water vapor spectrum generated as illustrated in FIG. 5. All values concerning the plurality of water vapor absorption frequencies may be used to generate a graph. A graph may be generated using values concerning a water vapor absorption frequency freely selected from the plurality of water vapor absorption frequencies by a user.

The radar chart illustrated in FIG. 8(a) is generated from a terahertz wave signal related to a certain liquid sample. The radar chart illustrated in FIG. 8(b) is generated from a terahertz wave signal related to a different liquid sample. In this manner, the graphs generated by the property analyzing unit 14 reflect a difference of properties of liquid samples, and the difference of properties clearly appears as a difference of shapes of the graphs. Thus, characteristics in accordance with the properties of the liquid samples can be explicitly visualized in the forms of the graphs. For example, a characteristic of a liquid sample that has been perceived only by human senses before can be objectively visualized as a form of a radar chart.

Here, the example is described in which the two radar charts are generated from the two different liquid samples individually. However, this is not limitative. For example, concerning each of the plurality of center frequencies $\lambda_{0i}$, a ratio $R_i$ of an amplitude $a_{0i}$ or a width $a_{1i}$ of a normal distribution function calculated based on a frequency spectrum of one liquid sample and an amplitude $a_{0i}$ or a width $a_{1i}$ of a normal distribution function calculated based on a frequency spectrum of the other liquid sample may be calculated to generate a graph illustrating a relationship between the center frequency $\lambda_{0i}$ and the ratio $R_i$.

Figure 9:
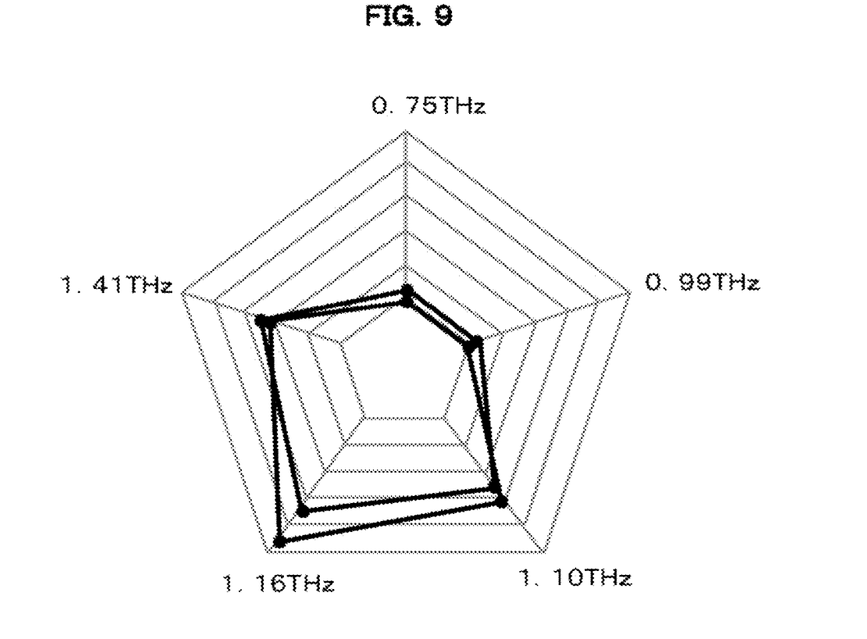

Note that a plurality of radar charts generated from a plurality of electromagnetic signals may be superposed on one another to be visualized. FIG. 9 is a diagram illustrating one example of this. In the example Illustrated in FIG. 9, a plurality of radar charts obtained by analyzing frequency spectra of an identical liquid sample that are measured by the spectral device 20 a plurality of times at intervals are superposed on one another to be visualized. This example visualizes how a property of the liquid sample changes as time elapses.

The example of FIG. 9 is a representation of a state change of the single liquid sample in accordance with a time elapse using the plurality of radar charts. However, a plurality of radar charts generated from a plurality of liquid samples may be superposed on one another to be visualized. In this case, when the plurality of liquid samples have an identical property, the plurality of radar charts generated have substantially the same shapes overlapping one another. Meanwhile, when the plurality of liquid samples have different properties, the radar charts generated have different shapes.

Thus, when radar charts are generated as to a plurality of liquid samples having unknown properties, it can be easily determined whether the liquid samples share an identical property or have different properties. When radar charts are individually generated from a single liquid sample having a known property and a plurality of liquid samples having unknown properties, liquid samples having the same known property can be easily identified.

Here, the example is described in which the plurality of radar charts obtained from the plurality of frequency spectra of the single liquid sample that, are measured at a plurality of points in time are superposed on one another to be visualized. However, this is not limitative. For example, a ratio $R_{it}$ of an amplitude $a_{0i}$ or a width $a_{1i}$ of a normal distribution function calculated based on a frequency spectrum of a liquid sample at a certain point in time and an amplitude $a_{0i}$ or a width $a_{1i}$ of a normal distribution function calculated based on a frequency spectrum of the liquid sample at a different point in time may be calculated with respect to each of the plurality of center frequencies $\lambda_{0i}$ so as to generate a graph illustrating a relationship between the center frequency $\lambda_{0i}$ and the ratio $R_{it}$.

Note that a mode of the graphs generated is not limited to radar charts. For example, line graphs, column charts, and scattergrams may be generated. Pie charts of an amplitude, a width, or an area with respect to each of center frequencies may be generated. Bubble charts may be generated in which a vertical axis represents the amplitude, and a horizontal axis represents the width while sizes of circles represent the center frequencies. Graphs (such as radar charts, line graphs, column charts, and scattergrams) illustrating a relationship between an amplitude and a width may be generated while center frequencies as a graph element are excluded.

Figure 10:
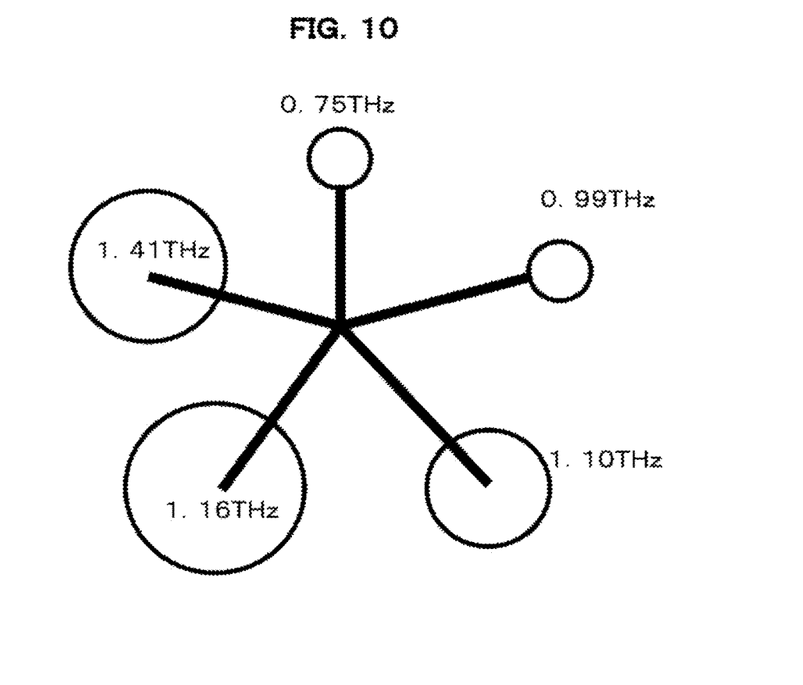

Further, a branch chart as illustrated in FIG. 10 may be generated. In FIG. 10, a plurality of axes (branches) represent the plurality of center frequencies $\lambda_{0i}$, a length of each of the axes represents one of the amplitude $a_{0i}$, the width $a_{1i}$, and the area $A_i$ of the normal distribution function while sizes of circles drawn on distal ends of the axes represent another of the amplitude $a_{0i}$, the width $a_{1i}$, and the area $A_i$ of the normal distribution function.

The above is some examples of generating graphs using at least two of the center frequencies $\lambda_{0i}$, the amplitudes $a_{0i}$, and the widths $a_{1i}$ of the plurality of normal distribution functions used for generating the water vapor spectrum.

The property analyzing unit 14 may generate a graph illustrating a relationship between at least two of the coefficients $b_j$ of the polynomial function used for generating the liquid spectrum. The graph generated using the at least two of the coefficients $b_j$ of the polynomial function may also be, for example, a radar chart, a line graph, a column chart, a scattergram, a pie chart, and a branch chart.

The property analyzing unit 14 may generate a graph using, as parameters, at least two values including values that determine characteristics of the plurality of fitting functions used for the fitting by the water vapor fitting processing unit 12 and values that determine characteristics of the plurality of fitting functions used for the fitting by the liquid fitting processing unit 13. For example, the property analyzing unit 14 may generate a graph illustrating a relationship between at least one of the center frequencies $\lambda_{0i}$, the amplitudes $a_{0i}$, and the widths $a_{1i}$ of the plurality of normal distribution functions used for the fitting by the water vapor fitting processing unit 12 and at least one of the coefficients $b_j$ of the polynomial function used for the fitting by the liquid fitting processing unit 13.

Here, a graph directly illustrating a relationship between at least one of the center frequency $\lambda_{0i}$, the amplitude $a_{0i}$, and the width $a_{1i}$ and at least one of the coefficients $b_j$ of the polynomial function may be generated.

Alternatively, after replacing the coefficients $b_j$ of the polynomial function with the center frequency $\lambda_{0j}$, the amplitude $a_{0j}$, and the width $a_{1j}$ so as to make kinds of parameters uniform, there may be generated a graph illustrating a relationship between at least one of the center frequency $\lambda_{0i}$, the amplitude $a_{0i}$, and the width $a_{1i}$ that are obtained from the water vapor spectrum and at least one of the center frequency $\lambda_{0j}$, the amplitude $a_{0j}$, and the width $a_{1j}$ that are obtained from the liquid spectrum. In this case, the liquid fitting processing unit 13 performs first fitting using the polynomial function indicated in (formula 2) as the plurality of fitting functions, and also performs second fitting using the composite waveform of the plurality of normal distribution functions with respect to the frequency spectrum (see FIG. 6) obtained by the first fitting.

Figure 11:
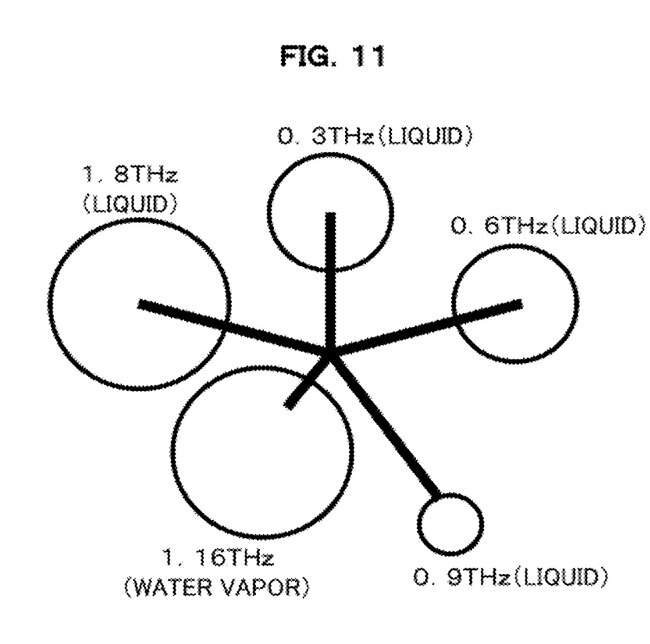

FIG. 11 illustrates an example of a branch chart generated by making uniform parameters obtained from the water vapor spectrum and parameters obtained from the liquid spectrum so as to include both of an element of the water vapor spectrum and an element of the liquid spectrum. The branch chart illustrated in FIG. 11 is generated in which one of five axes (branches) represents an element of the water vapor spectrum while the other four represent elements of the liquid spectrum. That is, the single center frequency $\lambda_{0i}$ obtained from the water vapor spectrum is represented by one axis, and one of the amplitude $a_{0i}$, the width $a_{1i}$, and the area $A_i$ of the normal distribution function is represented by a length of the axis while another of the amplitude $a_{0i}$, the width $a_{1i}$, and the area $A_i$ of the normal distribution function is represented by a size of a circle drawn on a distal end of the axis. Four, center frequencies obtained from the liquid spectrum are represented by four axes, and one of the amplitude $a_{0j}$, the width $a_{1j}$, and the area $A_j$ of the normal distribution function is represented by lengths of the four axes while another of the amplitude $a_{0j}$, the width $a_{1j}$, and the area $A_j$ of the normal distribution function is represented by sizes of circles drawn on distal ends of the four axes.

Note that here, the example is described in which after the first fitting is performed using the polynomial function indicated in (formula 2), the second fitting is performed using the composite waveform of the plurality of normal distribution functions with respect to the frequency spectrum thus obtained so as to obtain values of the center frequency $\lambda_{0j}$, the amplitude $a_{0j}$, and the width $a_{1j}$ of the plurality of normal distribution functions concerning the liquid spectrum. However, the invention is not limited to this. That is, fitting with the composite waveform of the plurality of normal distribution functions may be directly performed with respect to the frequency spectrum except for peak components at the water vapor absorption frequencies in the frequency spectrum obtained by the frequency spectrum obtaining unit 11.

As described in detail above, in this embodiment, the waveform of the single fitting function or the composite waveform of the plurality of fitting functions is fitted to the frequency spectrum at the water vapor absorption frequency in the frequency spectrum, of the electromagnetic signal obtained by the spectral device 20, and the value that determines the characteristic of the fitting function used for the fitting is used to analyze the property of the liquid sample.

The frequency spectrum at the water vapor absorption frequency reflects the property of water vapor that is generated around the liquid sample. Since this water vapor includes the property of the liquid sample, processing of the frequency spectrum at the water vapor absorption frequency makes it possible to analyze the property of the liquid sample. Besides, the frequency spectrum of the water vapor has a peak clear and sharp and accordingly easy to read.

According to the embodiment of the above-described configuration, the frequency spectrum, caused by the water vapor generated from, the liquid sample is approximated by the waveform of the single fitting function or the composite waveform, of the plurality of fitting functions in such a manner that the property of the liquid sample is succeeded, and the property of the liquid sample is analyzed based on values concerning the fitting function used for the approximation. Thus, according to this embodiment, the electromagnetic signal detected by the spectral device 20 is subjected to analysis that positively utilizes absorption of the electromagnetic waves by the water vapor so that the characteristic inherent in the liquid sample can be easily detected.

In this embodiment, the composite waveform of the plurality of fitting functions is fitted to the frequency spectrum except for the peak component at the water vapor absorption frequency in the frequency spectrum of the electromagnetic signal obtained by the spectral device 20, and the value that determines the characteristic of the plurality of fitting functions used for the fitting is used to analyze the property of the liquid sample. Here, fitting of the whole frequency spectrum, is performed so as to establish the relationship of "the whole fitting spectrum=the water vapor spectrum+the liquid spectrum".

Thus, a property of the liquid sample reflected by the frequency spectrum, at the water vapor absorption frequency when the electromagnetic waves are transmitted through the water vapor around the liquid sample and a property of the liquid sample reflected by the frequency spectrum at frequencies other than the water vapor absorption frequency when the electromagnetic waves are transmitted through or reflected off the liquid sample are totally analyzed so that the characteristic inherent in the liquid sample can be easily detected.

Besides, in this embodiment, in the fitting of the liquid spectrum, the absorbance data itself at the water vapor absorption frequency is not deleted but only the peak component at the water vapor absorption frequency is simply separated to perform the fitting. Consequently, the liquid spectrum can be obtained without lack of spectral data at the water vapor absorption frequency. Thus, the property of the liquid sample reflected by the electromagnetic waves when the electromagnetic waves are transmitted through or reflected off the liquid sample can be analyzed with higher accuracy than the method disclosed in patent document 1.

In the embodiment, the example is described in which the water vapor fitting processing unit 12 performs the fitting using the plurality of normal distribution functions such as (formula 1), and the property analyzing unit 14 analyzes the property of the liquid sample using the center frequencies, the amplitudes, and the widths of the plurality of normal distribution functions. However, the invention is not limited to this. For example, the water vapor fitting processing unit 12 may perform the fitting using the polynomial function such as (formula 2), and the property analyzing unit 14 may analyze the property of the liquid sample using the coefficients of the polynomial function.

In the embodiment, the example is described in which the liquid fitting processing unit 13 performs the fitting using the polynomial function such as (formula 2), and the property analyzing unit 14 analyzes the property of the liquid sample using at least two of the coefficients of the polynomial function. However, the invention is not limited to this. For example, the liquid fitting processing unit 13 may perform the fitting using the composite waveform of the plurality of normal distribution functions, and the property analyzing unit 14 may analyze the property of the liquid sample using at least, two of the center frequencies, the amplitudes, and the widths of the plurality of normal distribution functions. When a waveform of a single normal distribution function can approximate a frequency spectrum at a liquid frequency to some extent, fitting may be performed using the waveform of the single normal distribution function, and the property analyzing unit 14 may analyze the properly of the liquid sample using one of a center frequency, an amplitude, and a width of the single normal distribution function.

In the embodiment, some examples are described in which the property of the liquid sample is analyzed using at least two values including the values that determine the characteristics of the plurality of fitting functions used for the fitting by the water vapor fitting processing unit 12 and the values that determine the characteristics of the plurality of fitting functions used for the fitting by the liquid fitting processing unit 13. However, the invention is not limited to the above-described examples.

In the embodiment, the configuration is described in which the electromagnetic signal analysis apparatus 10 includes both of the water vapor fitting processing unit 12 and the liquid fitting processing unit 13. However, the invention is not limited to this. For example, the electromagnetic signal analysis apparatus 10 may have a configuration including only the water vapor fitting processing unit 12. In this case, the frequency spectrum obtaining unit 11 may obtain the frequency spectrum at the water vapor absorption frequency instead of obtaining the frequency spectrum at all frequencies.

In the embodiment, the normal distribution function (Gaussian function) is used as one example of functions used for fitting. However, the fitting is implementable even using a Lorentzian function and a Voigt function, for example. Probability distribution functions having non-centro-symmetrical shapes, namely, asymmetrical shapes, such as a Poisson distribution function (probability mass function, cumulative distribution function) and a chi-square distribution function (probability density function, cumulative distribution function) may be used, and other functions having mountain-shaped waveforms may be used. In the case of using the probability distribution function, fitting is performed using, as a parameter, a value that represents a characteristic of a probability distribution (such as a central value or a mode of an amplitude, a frequency at which the amplitude value can be obtained, and a frequency width that makes the amplitude equal to or larger than a predetermined value or equal to or less than the predetermined value). In the case of using the mountain-shaped function, fitting is performed using, as a parameter, a maximum amplitude to be an apex, a frequency at which the maximum amplitude can be obtained, a frequency bandwidth that makes the amplitude equal to or larger than a predetermined value or equal to or less than the predetermined value, and the like.

In the embodiment, the example is described in which the absorbance is used as the property value of the electromagnetic signal to obtain the frequency spectrum that represents the absorbance with respect to the frequency. However, other property values such as a transmittance may be used.

In other respects, any of the above-described embodiment is a mere example of embodying to implement the invention with which the technical scope of the invention should not be construed in a limiting sense. That is, the invention is implementable in various manners without departing from the subject matter or the major characteristics.

DESCRIPTION OF REFERENCE NUMERALS AND SIGNS

10: electromagnetic signal analysis apparatus
11: frequency spectrum obtaining unit
12: water vapor fitting processing unit.
13: liquid fitting processing unit
14: property analyzing unit
20: spectral device

The invention claimed is:

1. An electromagnetic signal analysis apparatus configured to analyze an electromagnetic signal obtained by a spectral device configured to detect electromagnetic waves transmitted through or reflected off a liquid sample in a film state that is generated in a space by ejecting a liquid from a nozzle, the electromagnetic signal analysis apparatus characterized by comprising:

a frequency spectrum obtaining unit configured to obtain a frequency spectrum that is generated based on the electromagnetic signal and represents a property value with respect to a frequency;

a water vapor fitting processing unit configured to fit a waveform of a single fitting function or a composite waveform of a plurality of fitting functions to a frequency spectrum at a water vapor absorption frequency in the frequency spectrum obtained by the frequency spectrum obtaining unit, the water vapor absorption frequency being a frequency at which absorption of the electromagnetic waves by water vapor is increased; and a property analyzing unit configured to analyze a property of the liquid sample using at least two values that determine a characteristic of the fitting function used for fitting by the water vapor fitting processing unit.

2. The electromagnetic signal analysis apparatus according to claim 1, characterized by further comprising a liquid fitting processing unit configured to fit a waveform of a single fitting function or a composite waveform of a plurality of fitting functions to a frequency spectrum except for a peak component at the water vapor absorption frequency in the frequency spectrum obtained by the frequency spectrum obtaining unit, wherein the property analyzing unit is configured to analyze the property of the liquid sample using at least two values including a value that determines the characteristic of the fitting function used for the fitting by the water vapor fitting processing unit and a value that determines a characteristic of the fitting function used for fitting by the liquid fitting processing unit.

3. The electromagnetic signal analysis apparatus according to claim 2, characterized in that the liquid fitting processing unit is configured to perform the fitting using, as the fitting function, a polynomial function including a plurality of terms, and the property analyzing unit is configured to analyze the property of the liquid sample using at least one of coefficients of the plurality of terms in the polynomial function used for the fitting by the liquid fitting processing unit.

4. The electromagnetic signal analysis apparatus according to claim 2, characterized in that the liquid fitting processing unit is configured to perform the fitting using, as the fitting function, a single or plurality of normal distribution functions, Lorentzian functions, Voigt functions, probability distribution functions, or other functions including mountain-shaped waveforms, and the property analyzing unit is configured to analyze the property of the liquid sample using at least one of a center frequency, an amplitude, and a width of the fitting function used for the fitting by the liquid fitting processing unit.

5. The electromagnetic signal analysis apparatus according to claim 2, characterized in that the water vapor fitting processing unit is configured to perform the fitting using, as the fitting function, a single or plurality of normal distribution functions, Lorentzian functions, Voigt functions, probability distribution functions, or other functions including mountain-shaped waveforms, the liquid fitting processing unit is configured to perform first fitting using, as the fitting function, a polynomial function including a plurality of terms, and is configured to perform second fitting with respect to a frequency spectrum obtained by the first fitting, using, as the fitting function, a single or plurality of normal distribution functions, Lorentzian functions, Voigt functions, probability distribution functions, or other functions including mountain-shaped waveforms, and the property analyzing unit is configured to analyze the property of the liquid sample using at least one of a center frequency, an amplitude, and a width of the fitting function used for the fitting by the water vapor fitting processing unit and at least one of a center frequency, an amplitude, and a width of the fitting function used for the second fitting by the liquid fitting processing unit.

6. The electromagnetic signal analysis apparatus according to claim 2, characterized in that the property analyzing unit is configured to generate a graph using, as parameters, at least two values including a value that determines the characteristic of the fitting function used for the fitting by the water vapor fitting processing unit and a value that determines the characteristic of the fitting function used for the fitting by the liquid fitting processing unit.

7. The electromagnetic signal analysis apparatus according to claim 2, characterized in that the water vapor fitting processing unit is configured to perform the fitting using, as the fitting function, a single or plurality of normal distribution functions, Lorentzian functions, Voigt functions, probability distribution functions, or other functions including mountain-shaped waveforms, and the property analyzing unit is configured to analyze the property of the liquid sample using at least one of a center frequency, an amplitude, and a width of the fitting function used for the fitting by the water vapor fitting processing unit.

8. The electromagnetic signal analysis apparatus according to claim 2, characterized in that the water vapor fitting processing unit is configured to perform the fitting using, as the fitting function, a polynomial function including a plurality of terms, and the property analyzing unit is configured to analyze the property of the liquid sample using at least one of coefficients of the plurality of terms in the polynomial function used for the fitting by the water vapor fitting processing unit.

9. The electromagnetic signal analysis apparatus according to claim 1, characterized in that the water vapor fitting processing unit is configured to perform the fitting using, as the fitting function, a single or plurality of normal distribution functions, Lorentzian functions, Voigt functions, probability distribution functions, or other functions including mountain-shaped waveforms, and the property analyzing unit is configured to analyze the property of the liquid sample using at least one of a center frequency, an amplitude, and a width of the fitting function used for the fitting by the water vapor fitting processing unit.

10. The electromagnetic signal analysis apparatus according to claim 1, characterized in that the water vapor fitting processing unit is configured to perform the fitting using, as the fitting function, a polynomial function including a plurality of terms, and the property analyzing unit is configured to analyze the property of the liquid sample using at least one of coefficients of the plurality of terms in the polynomial function used for the fitting by the water vapor fitting processing unit.

11. The electromagnetic signal analysis apparatus according to claim 1, characterized in that the property analyzing unit is configured to generate a graph using, as parameters, at least two values that determine the characteristic of the fitting function used for the fitting by the water vapor fitting processing unit.

12. An electromagnetic signal analysis apparatus configured to analyze an electromagnetic signal obtained by a spectral device configured to detect electromagnetic waves transmitted through or reflected off a liquid sample in a film state that is generated in a space by ejecting a liquid from a nozzle, the electromagnetic signal analysis apparatus characterized by comprising:

a frequency spectrum obtaining unit configured to obtain a frequency spectrum that is generated based on the electromagnetic signal and represents a property value with respect to a water vapor absorption frequency, which is a frequency at which absorption of the electromagnetic waves by water vapor is increased;

a water vapor fitting processing unit configured to fit a waveform of a single fitting function or a composite waveform of a plurality of fitting functions to the frequency spectrum obtained by the frequency spectrum obtaining unit; and a property analyzing unit configured to analyze a property of the liquid sample using at least two values that determine a characteristic of the fitting function used for fitting by the water vapor fitting processing unit.

13. An electromagnetic signal analysis program, stored on a non-transitory computer readable medium, configured to analyze an electromagnetic signal obtained by a spectral device configured to detect electromagnetic waves transmitted through or reflected off a liquid sample in a film state that is generated in a space by ejecting a liquid from a nozzle, the electromagnetic signal analysis program being configured to cause a computer to function as:

frequency spectrum obtaining means for obtaining a frequency spectrum that is generated based on the electromagnetic signal and represents a property value with respect to a frequency;

water vapor fitting processing means for fitting a waveform of a single fitting function or a composite waveform of a plurality of fitting functions to a frequency spectrum at a water vapor absorption frequency in the frequency spectrum obtained by the frequency spectrum obtaining means, the water vapor absorption frequency being a frequency at which absorption of the electromagnetic waves by water vapor is increased; and property analyzing means for analyzing a property of the liquid sample using at least two values that determine a characteristic of the fitting function used for fitting by the water vapor fitting processing means.

14. The electromagnetic signal analysis program according to claim 13, characterized by further causing the computer to function as liquid fitting processing means for fitting a waveform of a single fitting function or a composite waveform of a plurality of fitting functions to a frequency spectrum except for a peak component at the water vapor absorption frequency in the frequency spectrum obtained by the frequency spectrum obtaining means, wherein the property analyzing means is configured to analyze the property of the liquid sample using at least two values including a value that determines the characteristic of the fitting function used for the fitting by the water vapor fitting processing means and a value that determines a characteristic of the fitting function used for fitting by the liquid fitting processing means.

* * * * *